Inventor
Charles F. Wren
A. B. Bowman
Attorney

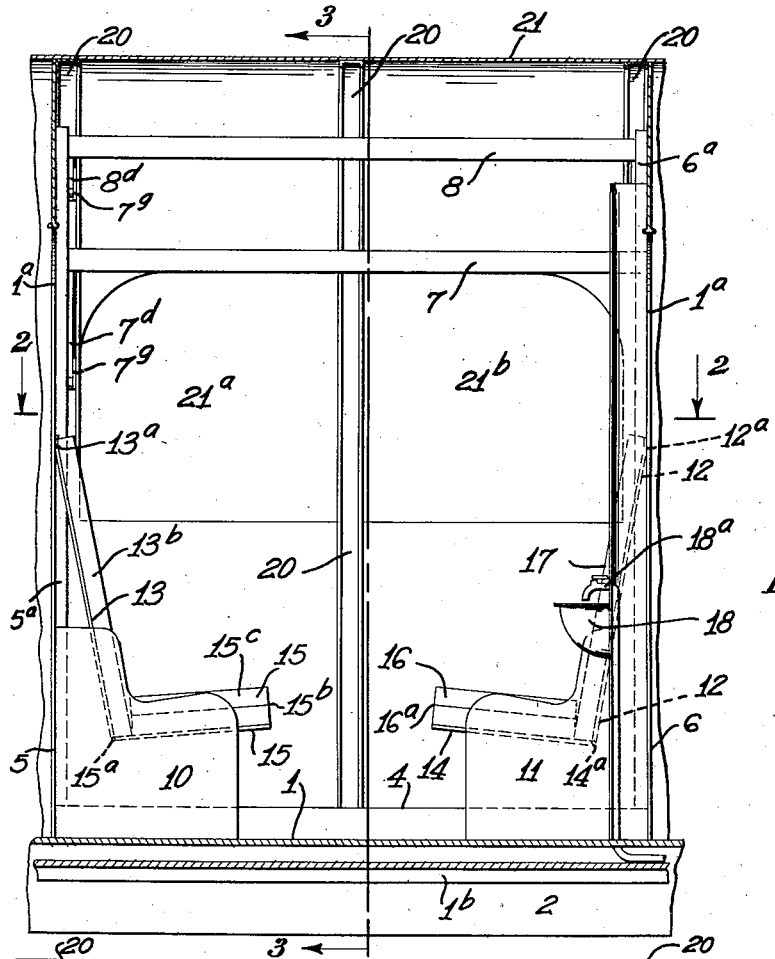
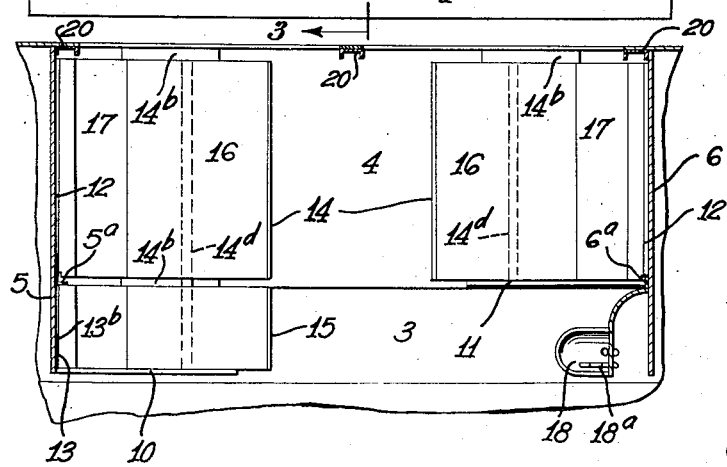

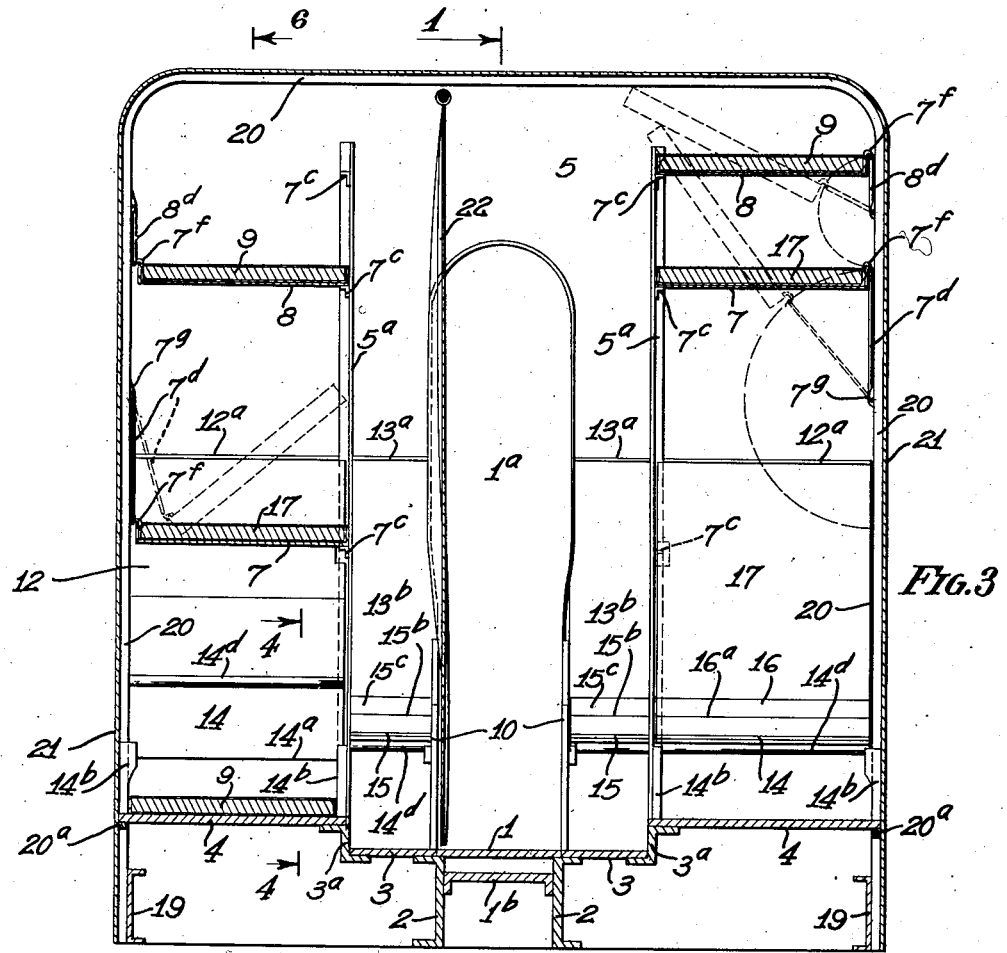

Patented Apr. 5, 1938

2,113,558

UNITED STATES PATENT OFFICE 2,113,558

VEHICLE SEAT, BERTH, AND DRESSING COMPARTMENT

Charles F. Wren, Los Angeles, Calif., assignor to Columbia Finance Co., Los Angeles, Calif., a corporation of California Application February 12, 1936, Serial No. 63,511

11 Claims. (Cl. 105—321)

My invention relates to seat, berth and dressing compartments in vehicles such as stages, busses or the like, and the objects of my invention are:

First, to provide very compact seat and berth compartments for vehicles.

Second, to provide combined seat, berth and dressing compartments that are very compact for vehicles.

Third, to provide quick and easily convertible seats and berth structures to be used in compartments for vehicles.

Fourth, to provide convertible seat and berth structures for compartments for vehicles that are metallic and therefore fireproof throughout except the bed clothing.

Fifth, to provide novelly arranged and positioned seat, berth, and dressing compartment for vehicles.

Sixth, to provide seat and berth compartment for vehicles in which there are provided three superposed berths at opposite sides of the aisle of the vehicle of ordinary height.

Seventh, to provide such a compartment in which the berths are readily converted into a seating compartment or the seats readily converted into a berth compartment.

Eighth, to provide a compartment of this class with novel means for supporting the baggage and luggage of the occupants occupying the seat in the compartment.

Ninth, to provide a structure of this class in which all available space is used for convertible seat and berth construction and dressing room.

Tenth, to provide new and novel convertible seats.

Eleventh, to provide new and novel convertible berths.

Twelfth, to provide new and novel dressing room compartment in connection with the berth.

Thirteenth, to provide a novel seat, berth and dressing compartment for vehicles which is very simple and economical of construction, easily operated and converted, durable, efficient, and which will not readily deteriorate or get out of order.

Figure 6:
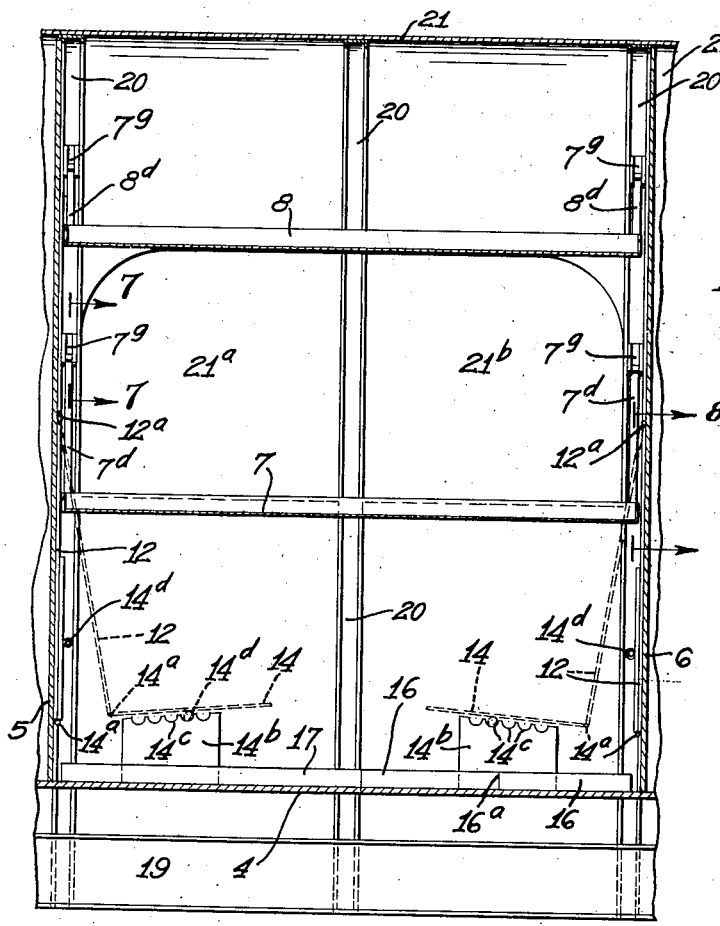
Figure 7:
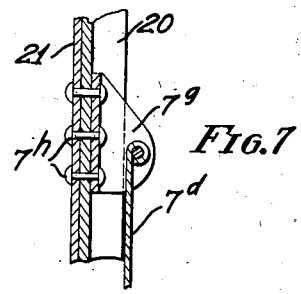
Figure 8:
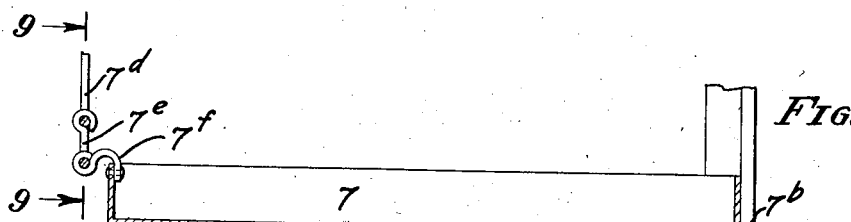
Figures 9, 10:
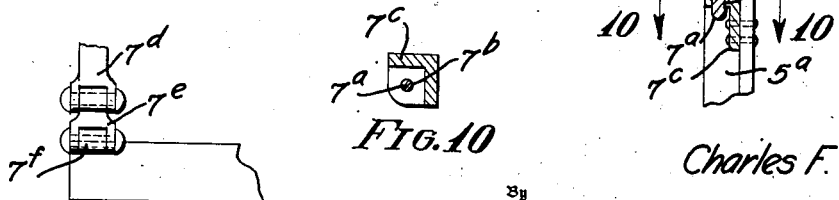

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional view from the line 1—1 of Fig. 3 showing one of my compartments open from the aisle and looking outwardly toward the side wall of the vehicle and showing the compartment arranged for seating and showing the berths in position when not in use; Fig. 2 is a fragmentary sectional view from the line 2—2 of Fig. 1 showing some of the parts in elevation to facilitate the illustration; Fig. 3 is a transverse sectional view across the whole of the vehicle taken from the line 3—3 of Fig. 1 and showing similar compartment construction on both sides of the aisle, the one on the left side being shown with the berths arranged ready for use while the one on the right side shows the seat ready for use and the berths when not in use and showing various positions of the berth by dotted lines; Fig. 4 is a sectional view from the line 4—4 of Fig. 3 and Fig. 5 an enlarged fragmentary sectional view from the line 5—5 of Fig. 4; Fig. 6 is a sectional view from the line 6—6 of Fig. 3 showing by dotted lines the berths in position ready for use and the seats in their used position by dotted lines and showing some of the parts and portions in elevation to facilitate the illustration; Fig. 7 is an enlarged fragmentary sectional view from the line 7—7 of Fig. 6; Fig. 8 is an enlarged fragmentary sectional view from the line 8—8 of Fig. 6; Fig. 9 is a fragmentary view from the line 9—9 of Fig. 8; and Fig. 10 a fragmentary sectional view from the line 10—10 of Fig. 8.

Similar characters of reference refer to similar parts and portions throughout the several views of the drawings:

The aisle floor member 1, middle frame members 2, dressing room floor members 3, compartment main floor members 4, partitions 5 and 6, bed frames 7 and 8, mattresses 9, seat sides 10 and 11, seat backs 12, dressing seat backs 13, seat bottoms 14, dressing seat bottoms 15, seat cushions 16, seat back cushions 17, wash basin 18, side frame members 19, wall frame members 20, side walls 21, and drapes 22, constitute the principal parts and portions of my vehicle, seat, berth and dressing compartments.

It is preferred to construct the vehicle body including the berths mainly of "dural" material, although they may be made of other material if desired. Longitudinally near the middle of the vehicle body are provided two spaced middle frame members 2 shown best in Fig. 3 of the drawings which provide the main support for the vehicle body. Supported upon these middle frame members 2 is the aisle floor member 1 which provides the aisle floor extending from front to rear of the vehicle body, it being noted that a channel member 1b is positioned some distance below the upper edge of the frame members 2 and spaced from the floor member 1 to form a readily accessible space for pipes, electric wiring and vehicle controls.

It will be here noted that the construction of the compartments on opposite sides of the aisle 1 are duplicates, therefore I will describe one compartment only which is one unit of which there may be a large number on opposite sides of the aisle and extending side by side on each side of the aisle from end to end of the vehicle body. Positioned on the upper edge of one of the members 2 is the dressing floor member 3 which is supported at its opposite side by means of a longitudinal Z-member 3a, and supported on the upper side of this Z-member 3a is the compartment main floor member 4, which is supported on the wall frame member 20 by means of longitudinally extending bars 20a at the opposite sides of the floor member 4 from the Z-member 3a. These wall frame members 20 are channel members with the extending members extending inwardly and a former side wall and top wall frame in single piece construction in inverted U-shape as shown best in Fig. 3 of the drawings. There are preferably three of these frame members 20 which form the outside framework of each compartment as shown best in Fig. 6 of the drawings. Secured on the outer side of these frame members 20 is the outer wall 21 in which is provided intermediate the upper and lower sides of the side wall windows 21a and 21b thus providing two windows in each compartment on each side of the central frame member 20 of said compartment shown best in Figs. 1 and 6 of the drawings.

Positioned on the outer side of the outer frame member 20 is a partition 5 and positioned on the outer side of the opposite frame member 20 is another partition 6 which partitions 5 and 6 form the end walls of each compartment, and these partitions 5 and 6 are supported between similar frame members 20, the end frame members in each compartment being positioned close together only leaving room enough for the partition 5 or 6 between the two frame members. Each of these partitions is provided with a central aisle opening 1a which is preferably wider at the upper portion than at the lower portion as shown best in Fig. 3 of the drawings.

Positioned on opposite sides of the aisle 1a and adapted to close the aisle side of each compartment are drapes 22, only one of which is shown positioned on the left side of the aisle in Fig. 3 of the drawings, thus providing means for closing the aisle side of the compartment in the conventional manner.

Positioned on the opposite sides of the aisle 1a at one end of each compartment is the dressing seat side 10 shown best in Fig. 1 of the drawings and positioned between this seat side 10 and the vertical portion of the Z-member 3a in one end of the dressing compartment above the dressing floor 3 is a dressing seat each consisting of a back portion 13 and a bottom portion 15, both of which are preferably of metallic plate the back portion 13 hinged at 13a and the bottom portion 15 hinged to the back portion 13 at 15a so that they will fold up against the partition 5 as shown by solid lines in Fig. 6 of the drawings when desired. Supported on the back 13 is a cushion 13b and supported on the bottom 15 is a double cushion 15c which is integrally connected at 15b so that they fold together for forming a bottom cushion but may be opened up. This provides a seat in one end of the dressing portion of the compartment. Supported on the wall in the other end of this dressing portion of the compartment is a wash basin 18 which is supplied with water from a faucet 18a, thus providing full dressing equipment for the dressing portion of the compartment.

Secured vertically to the partitions 5 and 6 and this immediately above the vertical portion 3a of the members 3 and between the dressing portion of the compartment and the main seating and berth compartment are angle members 5a and 6a, and positioned between the angle members 5a and frame members 20 at one end of the seat and berth portion of the compartment and between the partition 6a and the member 20 in the opposite end of the seat and berth portion of the compartment are seats including the seat backs 12 and seat bottoms 14. These seat backs 12 are pivoted at 12a and the seat bottoms 14 are pivotally connected to the lower end 12 at 14a so that these seat bottoms fold up against the seat back and the seat back folds against the partition as shown best by solid lines in Fig. 6 of the drawings thus providing two seats one of these seats in each end of the compartment over the floor 4. Each of these seats is provided with a double bottom cushion 16 hinged at 16a and foldable against itself providing a double cushion as shown by solid lines in Fig. 1 of the drawings but may be opened up to double width and single thickness as shown by solid lines in Fig. 6 of the drawings to serve as berth mattresses as will be hereinafter described. All of the seats in both the dressing compartment and main compartment are supported at opposite sides by brackets 14b which are provided with a plurality of curved bottom notches 14c which are adapted to receive pipe members 14d which are secured on the lower side of the bottom, thus providing means for adjusting the relative forward and backward positions of the seat on the brackets.

The pipes supporting the main seat in adjusted position on the brackets 14b and the pipe supporting the seat in the dressing portion of the compartment are supported in relation to each other by means of bolt members 14e shown best in Fig. 5 of the drawings so that the bolt may be withdrawn for removing or shifting either seat backwardly in folding position as desired. The pipe 14d is supported on the chair bottom by means of clips 14f.

Supported in the upper portion of the main seat and berth compartment are superposed berths or bed frames 7 and 8 each of which consists of a rectangularly shaped metal pan-like member slightly shorter than the length of the compartment and slightly narrower than the width of the compartment. It is provided near its two inner corners facing toward the aisle with lugs 7a which are adapted to fit in holes 7b in angular bracket 7c shown best in Figs. 8 and 10 of the drawings. The opposite sides of these members 7 are supported by means of link members 7d which connect with short link members 7e which are pivotally connected with brackets 7f, thus providing a double close joint for the pivotal support of the bed frame. The links 7d are pivotally supported at their upper ends upon brackets 7g shown best in Fig. 7 of the drawings. These brackets 7g are supported in the channels 20 by means of rivets 7h which pass through the main body of channel 20 and also through the side walls 21 shown best in Fig. 7 of the drawings. It will be noted that the link support for the bed frame 8, which I have designated 8d, shown best in Fig. 3 of the drawings is considerably shorter than the link 7d. Otherwise all of the supporting parts are the same for the said frame 8 as for 7. However it will be noted that the link 7c may be omitted in connection with the shorter link 8d and the link 8d connected directly with the bracket 7f.

There are two supports 7g at each end of the compartment in superposed relation in each end of each compartment and there are three supports 7c secured to the brackets 5a at each end of the compartment all as shown best in Fig. 3 of the drawings, thus providing means for supporting the berth, consisting of the bed frames and mattresses 9 in used and unused positions as shown best in Fig. 3 of the drawings, the used position being shown by solid lines at the left side of the aisle in Fig. 3 and shown in unused position at the right side of the aisle in Fig. 3 of the drawings, it being noted that in the used position the link members 7d extend downwardly from their support and therefore said berths are suspended and supported in tension, and in the unused position the link members extend upwardly from their support as shown on the right side of the aisle in Fig. 3 of the drawings and therefore support the berth in compression. The berth, including the bed frame and mattresses, being shifted to varying tilted positions around the pivotal axis of the links 7d as shown by dotted lines in Fig. 3 of the drawings. For instance in shifting the berth from used to unused positions, the berth 8 at the left side of Fig. 3 of the drawings is raised so that the lug 7a is disengaged from the bracket 7c and the inner side of the berth shifted upwardly in dotted line position as shown at the right side of Fig. 3, the link going around its pivotal axis until the link is in an upright position from its pivotal support then the inner side of the berth is lowered and the lug 7a enters the bracket 7c which is the uppermost bracket on the angle member 5a. Then the berth member 7 is shifted in a like manner and its inner side rests in the second bracket in which the berth 8 rested at its inner side when in use. It will be here noted that the upper berth 8 when not in use carries a mattress which fits the bed frame and the mattress remains in the frame when in use or when not in use.

The mattress, however, for the bed frame 7 consists of one of the back mattresses for one of the seats and one of the double mattresses for the bottom of one of the seats, while the lower berth consists of mattresses formed of the other seat back cushion and seat bottom cushion all unfolded and resting on the floor 4 as shown in Fig. 6 of the drawings at which time the seats of these compartments are folded back as shown by solid lines in Fig. 6 of the drawings, thus providing three superposed berths in each compartment on each side of the aisle.

Though I have shown and described a particular construction, combination and arrangement of parts and portion, I do not wish to be limited to this particular construction, combination and arrangement, but desire to include in the scope of my invention the construction, combination and arrangement substantially as set forth in the appended claims.

Having thus described my invention what I claim as new and desire to secure by Letters Patent is:

1. In a vehicle seat, berth and dressing compartment, an aisle positioned longitudinally of the vehicle in the middle thereof, a long narrow dressing room compartment positioned at one side thereof having the same floor level as said aisle, and a foldable seat in one end only of said dressing compartment.

2. In a vehicle seat, berth and dressing compartment, an aisle positioned longitudinally of the vehicle in the middle thereof, a long narrow dressing room compartment positioned at one side thereof having the same floor level as said aisle, a foldable seat in one end only of said dressing compartment and a wash basin positioned in the opposite end of said compartment.

3. In a vehicle seat, berth and dressing compartment, an aisle positioned longitudinally of the vehicle in the middle thereof, a long narrow dressing room compartment positioned at one side thereof having the same floor level as said aisle, a foldable seat in one end only of said dressing compartment, a wash basin positioned in the opposite end of said compartment, and a combined seat and berth compartment positioned adjacent said dressing compartment with an elevated floor level provided with convertible seats and berths therein.

4. In a vehicle seat, berth and dressing compartment, an aisle positioned longitudinally of the vehicle in the middle thereof, a long narrow dressing room compartment positioned at one side thereof having the same floor level as said aisle, a foldable seat in one end only of said dressing compartment, a wash basin positioned in the opposite end of said compartment, a combined seat and berth compartment positioned adjacent said dressing compartment with an elevated floor level provided with convertible seats and berths therein, and consisting of seats foldable against the end walls of said compartment with the bottoms of said seats foldable against the back thereof.

5. In a vehicle seat, berth and dressing compartment, an aisle positioned longitudinally of the vehicle in the middle thereof, a long narrow dressing room compartment positioned at one side thereof with its floor flush with said aisle, a foldable seat in one end only of said dressing compartment, a wash basin positioned in the opposite end of said compartment with an elevated floor level, a combined seat and berth compartment positioned near said dressing compartment provided with convertible seats and berths therein and consisting of seats foldable against the end walls of said compartment with the bottoms of said seats foldable against the back thereof and berths pivotally shiftably mounted at one side of each compartment in raised and lowered relative positions.

6. In a vehicle seat, berth and dressing compartment, a seat including a plate member forming a back pivotally supported at its upper end, a seat bottom portion hinged thereto so as to fold against said back, a downwardly projecting member secured on the bottom of said seat bottom and seat brackets for supporting said seat bottom provided with a plurality of notches in its upper edge.

7. In a vehicle seat, berth and dressing compartment, a seat including a plate member forming a back pivotally supported at its upper end, a seat bottom portion hinged thereto so as to fold against said back, a downwardly projecting member secured on the bottom of said seat bottom, seat brackets for supporting said seat bottom provided with a plurality of notches in its upper edge, a back cushion for said seat back and a double foldable cushion for said seat bottom said back cushions and bottom cushions when extended forming a berth mattress.

8. In a vehicle seat, berth and dressing compartment a seat including a plate member forming a back pivotally supported at its upper end, a seat bottom portion hinged thereto so as to fold against said back, a downwardly projecting member secured on the bottom of said seat bottom, seat brackets for supporting said seat bottom provided with a plurality of notches in its upper edge, a back cushion for said seat back, a double foldable cushion for said seat bottom said back cushions and bottom cushions when extended forming a berth mattress, and a compartment in each end of which one of said seats is mounted and foldable against the ends of said compartment.

9. In a vehicle seat, berth and dressing compartment a seat including a plate member forming a back pivotally supported at its upper end, a seat bottom portion hinged thereto so as to fold against said back, a downwardly projecting member secured on the bottom of said seat bottom, seat brackets for supporting said seat bottom provided with a plurality of notches in its upper edge, a back cushion for said seat back, a double foldable cushion for said seat bottom said back cushions and bottom cushions when extended forming a berth mattress, a compartment in each end of which one of said seats is mounted and foldable against the ends of said compartment, the cushions of one of said seats forming a mattress for the floor of said compartment for forming a berth thereon.

10. In a vehicle berth and compartment construction, a berth member, means for suspending said berth member on the side wall of the compartment arranged for tilting said berth in the compartment and raising the same, and said means consisting of a link member pivotally supported on the wall of the compartment and pivotally connected with one side of the berth and arranged to suspend the berth in its lowered position and forming a strut for supporting the berth when in raised position.

11. In a vehicle berth and compartment construction, a berth member, means for suspending said berth member on the side wall of the compartment arranged for tilting said berth in the compartment and raising the same, said means consisting of a link member pivotally supported on the wall of the compartment and pivotally connected with one side of the berth and arranged to suspend the berth in its lowered position and forming a strut for supporting the berth when in raised position, and means secured to the side wall at the opposite side of the berth compartment in superposed relation for supporting said opposite side of the berth in varied raised and lowered positions.

CHARLES F. WREN.